Dec. 25, 1923.
A. C. JAGO ET AL
1,478,475
ADVERTISING DEVICE FOR ROAD AND OTHER VEHICLES
Filed April 18, 1923
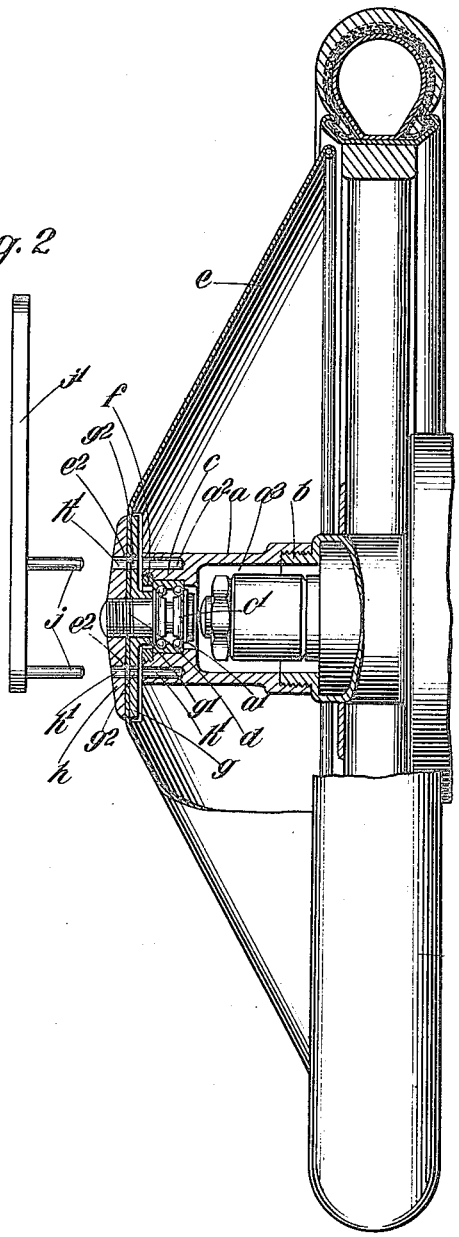
INVENTORS:
Alfred C. Jago
Edwin A. Wade
BY Wm Wallace White
ATTY.

Patented Dec. 25, 1923.

1,478,475

UNITED STATES PATENT OFFICE.

ALFRED CHARLES JAGO AND EDWIN ARMITAGE WADE, OF CROYDON, ENGLAND.

ADVERTISING DEVICE FOR ROAD AND OTHER VEHICLES.

Application filed April 18, 1923. Serial No. 632,961.

*To all whom it may concern:*

Be it known that we, ALFRED CHARLES JAGO and EDWIN ARMITAGE WADE, subjects of George V, King of Great Britain and Ireland, residing, as to the said ALFRED CHARLES JAGO, at 22 Godson Road, Croydon, in the county of Surrey, England, and as to the said EDWIN ARMITAGE WADE, at 81 London Road, Croydon, aforesaid, England, have invented new and useful Improvements in Advertising Devices for Road and Other Vehicles, of which the following is a specification.

This invention relates to advertising devices for road and other vehicles comprising a disc, plate or the like suspended at the side of a road wheel and adapted to carrying advertising matter. The chief object of this invention is to provide an improved and simplified construction and working of devices of the kind referred to.

The invention is illustrated in the accompanying drawing in which Fig. 1 is an edge view partly in section, of an ordinary pneumatic-tired wheel with a live axle having our floating disc mounted thereon, and Fig. 2 is a side elevation of a tool adapted for use in assembling the device.

Referring to the drawings, we provide a special hub-cap $a$ the inner end of which is internally threaded so that it can be screwed on to the hub $b$ of the wheel $b^1$, and the outer end of which is furnished with a ball-bearing $c$, $c^1$. Secured friction-tight or otherwise within the inner portion $c^1$ of the ball bearing is a spindle $d$, the outer end of which carries a floating advertising disc $e$. The ball bearing preferably has a double row of balls, to prevent rocking of the disc, and is sunk against a shoulder $a^1$ formed in a recess in the outer end of the cap $a$. By forming the recess in the outer end of the cap, it can be machined with ease from such outer end. The ball bearing may be kept in place by means of a locking-ring $f$.

The disc is secured between an outer nut $h$ screwed on to the spindle and an inner flanged collar $g$, which is mounted loosely on the spindle $d$. The collar has an inwardly projecting boss $g^1$ which engages the outer face of the inner portion $c^1$ of the ball bearing. Preferably, the inner faces of the flanged collar $g$ and the nut $h$, also the central portion of the disc $e$ engaged by such flanged collar and nut, are made flat, as shown.

Holes $a^2$, $g^2$, $e^2$ and $h^1$ are provided respectively in the outer end of the cap $a$, the flanged collar $g$, the disc $e$ and the nut $h$, which holes can be brought into registration with one another. The holes in each of these parts are conveniently two in number and they may be disposed diametrically opposite one another.

In assembling the apparatus, the nut $h$ is screwed up tightly thereby gripping the disc $e$ firmly between the flanged collar $g$ and the nut $h$ and at the same time forcing the said boss $g^1$ tightly against the inner portion of the ball bearing. Thus, when the whole is screwed up tightly, the inner portion of the ball bearing, the spindle, the flanged collar, the disc and the nut become virtually a single rigid body.

As the disc is preferably made of conical shape and is arranged so that its periphery lies close to the felloe of the wheel, it will be understood that with such an arrangement the cap $a$ could only with difficulty be reached for the purpose of screwing it on to the wheel-hub. In order to avoid this difficulty, the holes $a^2$, $g^2$, $e^2$ and $h^1$ are brought into alignment with one another and the pins $j$ of a pin spanner $j^1$ are inserted into them from outside. In this way, the cap $a$ is reached by the pin-spanner and can be screwed into position on to the wheel-hub. Thus, the whole apparatus can be assembled as a single unit ready for the market, and then all that the purchaser has to do is to remove the existing hub-cap and screw the new device into its place, whereupon such device is ready for use.

The space $a^3$ within the cap is intended to be filled with lubricant whereby the ball bearing $c$, $c^1$ is kept continually lubricated.

In some cases, the cap is externally threaded so that it can be screwed into an internally threaded hub.

If desired, the cap may be provided with flats to take a spanner which can be shaped so that it can be introduced between the periphery of the disc and the felloe of the wheel, and in such a case, the holes $a^2$, $g^2$, $e^2$ and $h^1$ may be dispensed with.

In an alternative construction, the flanged collar is spot-welded or otherwise fixed to the disc and is screwed on the spindle tightly up to the inner portion of the ball bearing. If desired, however, the flanged collar can be dispensed with, and the disc can itself be screwed on the spindle. In this way the middle portion of the disc is not covered by a nut and can be shaped to a point if so desired. Holes may be provided to take a pin-spanner as above described for the purpose of screwing the device on to or into the wheel-hub.

Instead of gripping the disc between a pair of nuts as above explained, it may be gripped between a collar provided on the short spindle and the head of a screw screwed into the spindle from the outer end of the latter. If desired a washer or lock nut may be placed between the head of said screw and the outer face of the disc.

Obviously, a plain bearing may, if desired, be employed instead of a ball bearing, and in such a case it may be desirable to connect the disc, by means of a spring or otherwise, to some suitable part of the vehicle so as to prevent its rotation.

Although the disc is preferably placed outside of the wheel, it may, in some cases, be placed at the inner side of the wheel.

The disc may have applied thereto any desired advertising matter and may also be provided with or constructed in the form of a human head or human figure, an animal or other object.

Thus, as the discs remain stationary while the wheels rotate they provide valuable advertising spaces which are particularly attractive to onlookers as they present somewhat the illusion of stationary wheels on a moving vehicle.

Provision may be made for illuminating the disc during darkness. For this purpose, the disc may be made in box-form of any shape to accommodate the illuminating devices. The light may be allowed to show through holes in the disc, or the disc may be made partially or wholly of translucent material. In some cases, the disc is coated with phosphorescent paint.

The disc may also be provided with a flap arranged to cover the side of the tire and come close to the road surface so as to constitute an anti-splashing device.

We claim:

1. An advertising device for road and other vehicles comprising a cap adapted to be screwed on to the wheel-hub, a spindle, a ball-bearing supporting said spindle in said cap, a portion of the inner part of said ball-bearing forming a shoulder with said spindle, a flanged collar loose on said spindle and in engagement with said shoulder, a nut screwed on said spindle, a disc or the like located between said flanged collar and said nut, said cap, flanged collar, nut, and disc or the like having holes which can be brought into register with one another for the purpose of receiving a tool whereby the flanged collar, the nut and the disc or the like can be secured in place on the said spindle.

2. An advertising device for road and other vehicles comprising a cap adapted to be screwed on to the wheel-hub, a spindle, a ball-bearing supporting said spindle in said cap, a portion of the inner part of said ball-bearing forming a shoulder with said spindle, a flanged collar loose on said spindle and in engagement with said shoulder and carrying also a disc or the like, a nut screwed on said spindle, said cap, flanged collar, nut, and disc or the like having holes which can be brought into register with one another for the purpose of receiving a tool whereby the flanged collar, the nut and the disc or the like can be secured in place on the said spindle.

3. An advertising device for road and other vehicles comprising a cap adapted to be screwed on to the wheel-hub, a spindle, a ball-bearing supporting said spindle in said cap, a portion of the inner part of said ball-bearing forming a shoulder with said spindle, a flanged collar screwed on said spindle and in engagement with said shoulder and carrying also a disc or the like, a nut screwed on said spindle, said cap, flanged collar, nut, and disc or the like having holes which can be brought into register with one another for the purpose of receiving a tool whereby the flanged collar, the nut and the disc or the like can be secured in place on the said spindle.

4. The combination with a vehicle road wheel of an advertising device comprising a cap adapted to be screwed on to the wheel-hub, a spindle, a ball-bearing supporting said spindle in said cap, a portion of the inner part of said ball-bearing forming a shoulder with said spindle, a flanged collar loose on said spindle and in engagement with said shoulder, a nut screwed on said spindle, a disc or the like located between said flanged collar and said nut, said cap, flanged collar, nut, and disc or the like having holes which can be brought into register with one another for the purpose of receiving a tool whereby the flanged collar, the nut and the disc or the like can be secured in place on the said spindle.

In testimony whereof we have signed our names to this specification.

ALFRED CHARLES JAGO.
EDWIN ARMITAGE WADE.

Witness:
H. T. P. GEE.